United States Patent Office 3,823,114
Patented July 9, 1974

---

3,823,114
ANTIOXIDANT FOR POLYMERIC HYDROCARBONS
Robert Vincent Albarino, Berkeley Heights, and Harold Schonhorn, New Providence, N.J., assignors to Bell Telephone Laboratories, Incorporated, Murray Hill and Berkeley Heights, N.J.
Filed Jan. 4, 1973, Ser. No. 320,974
Int. Cl. C08f 45/60
U.S. Cl. 260—45.9 R                     4 Claims

ABSTRACT OF THE DISCLOSURE

The migration of antioxidants from polymeric hydrocarbons is retarded by bonding the antioxidant with silane coupling agents.

---

This invention relates to stabilized polymeric compositions. More particularly, the present invention relates to essentially saturated hydrocarbon polymeric materials having included therein small amounts of additives which exhibit a retarding effect upon deleterious oxidation of the material.

Consderable study has been devoted to the effects and prevention of thermal oxidation in the more common saturated polymers, particularly polyethylene and polypropylene. Thermal oxidation as discussed herein is oxidation normally occurring in ordinary atmospheres, essentially independent of ultraviolet light, which varies or accelerates with increasing temperature. In recent years a wide variety of antioxidant materials have been developed to provide a marked retardation of thermal oxidation. These antioxidants characteristically require an antioxidant radical such as a secondary amino group or a hydroxyl group attached to an aromatic ring, such compounds resulting in a resonant stabilized structure. Typically, these compounds also contain additional substituents such as branched or normal aliphatic groups. More thorough treatment of antioxidant materials and the mechanism involved therein may be found in G. W. Whelands, *Advanced Organic Chemistry*, 2nd Edition, Chapters 9 and 10.

Unfortunately, it has been observed that normally solid polymers of an alpha olefin stabilized against thermal oxidation by catalytic quantities of the aforementioned antioxidants evidence a loss of oxidative stability with the passage of time. This loss of stability has been attributed to either depletion of active antioxidant by chemical reaction or physical loss of the stabilizer through diffusion and volatilization.

Accordingly, workers in the art have focused their interest upon the development of a technique for modifying antioxidants so as to simultaneously increase compatibility with α olefins while obviating or substantially lessening the adverse effects of physical migration.

In accordance with the present invention, it has been determined that the migration of antoxidants from polymeric hydrocarbons may be effectively retarded by bonding the antioxidant with a silane coupling agent. Briefly, the invention involves reacting a silane compound of the general formula

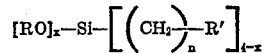

wherein R is selected from the group consisting of methyl and ethyl radicals, R' is selected from the group consisting of

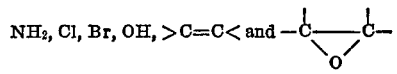

radicals, $x$ is an integer from 1–4 and $n$ is an integer from 1–10, with a conventional arylamine, (A), antioxidant of the type noted above, so resulting in a compound of the general formula (a)

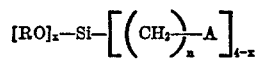

or (b)

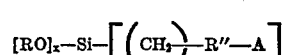

wherein A represents a conventional arylamine antioxidant radical with an additional substituent on the aromatic portion capable of reacting with the silane R' groups, R, $x$ and $n$ are as represented above and R'' is selected from the group consisting of

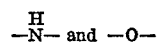

radicals. The resultant silane antioxdants are found to be far more compatible with alpha olefins than the antioxidant alone and upon prolonged exposure to the atmosphere evidence less migration or physical loss than the antioxidant alone.

The invention will be more readily understood by reference to the following detailed description taken in conjunction with the accompanying drawing wherein.

Figure 1:
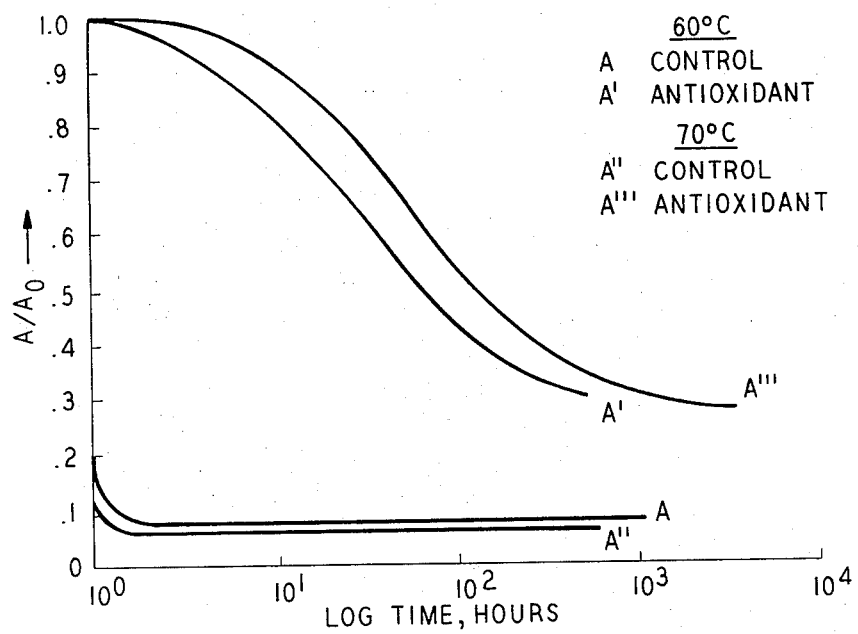
FIG. 1 is a graphical representation on coordinates of time versus antioxidant concentration for polyethylene samples containing the reaction product of 3-hydroxydiphenylamine and γ-aminopropyltriethoxyslane, and a control comprising 3-hydroxydiphenylamine alone.

The polymeric materials suitable for use in accordance with the present invention are polymers containing tertiary hydrogen atoms. Such polymers are of two general types, those containing random numbers and spacings of tertiary hydrogen atoms such as polyethylene and those containing ordered hydrogen atoms such as polypropylene. The present invention relates to either type and mixtures thereof or copolymers containing one or more of either type. Specific compounds suitable for use in the present nvention are polymers of olefins such as polyethylene, both conventional and high density, polypropylene, poly-4-methylpentene-1, poly-4,4 dimethylpentene-1, polydodecene-1 and poly-3-methylpentene-1.

Although the most common polymeric materials falling within the class delineated above are the polymerization products of monomers containing four or fewer carbon atoms, polymerized products of high order monomers and copolymers and mxtures containing such polymers may also be stabilized in accordance with the present invention.

As indicated, the silane antioxidants utilized in the practice of the present invention may be prepared by reacting an alkoxy silane (of the type described) with an arylamine antioxidant having a substituent Y on the aromatic portion capable of reacting with the R' group in the silane compound. The Y group may conveniently be selected from among NH$_2$, OH, Cl, Br, and COOH radicals. Typical compositions suitable for such purposes are:

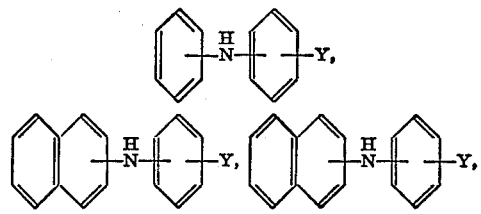

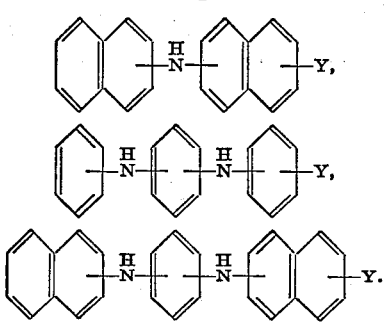

The reaction which occurs may be represented as follows:

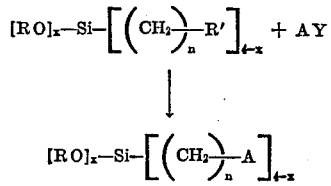

or

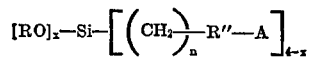

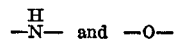

wherein R″ is selected from the group consisting of $$-\underset{\mathrm{H}}{\mathrm{N}}- \text{ and } -\mathrm{O}-$$

radicals.

A typical product of this type is obtained by reacting the following compounds:

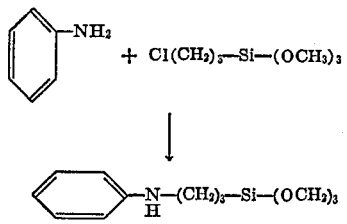

Similarly, the novel antioxidants described herein may be prepared by reacting an alkoxysilane with a hydroxylated arylamine antioxidant, bridging to the silicon being effected through an oxygen atom. Arylamines suitable for this purpose include:

(a)
(b)
(c)
(d)
(e)
(f)

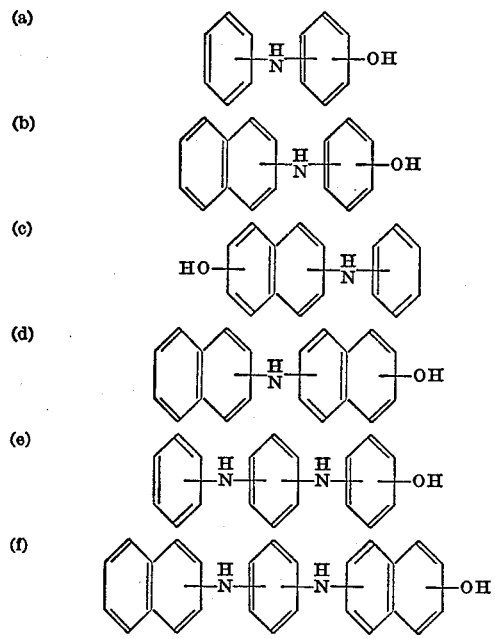

The reaction which occurs may be represented as follows:

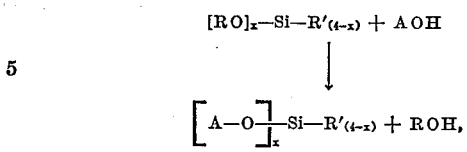

the designations for R, R′, x and A being as described previously.

A typical product of this type is obtained by reacting 3 hydroxydiphenylamine with aminopropyltriethoxysilane as follows:

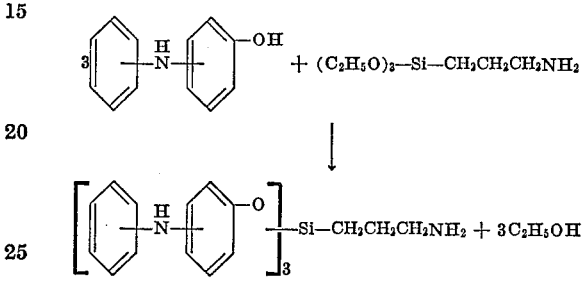

These reactions typically occur by reacting a molar excess of the silane compound with the arylamine while heating to temperatures of the order of 100° C.

The antioxidants of the present invention are most effective in the range of 0.005 to 2 percent by weight, based upon the weight of the polymer. Although the aforementioned range is not absolute, it will be understood that the minimum is dictated by considerations relating to the amount found necessary to effect significant antioxidant properties. The maximum is dictated by economic and practical considerations. It will be further understood that additional materials can also be used in the compositions described such as conventional pigments, reinforcing agents, fillers, accelerators and the like which are well known in the art.

In order to aid in the understanding of the invention, an outline of the procedure employed in determining antioxidant effect will now be given.

Initially, an antioxidant of the type described herein was either obtained from commercial sources or synthesized. Thus, for example, in a typical case of the antioxidant in which bridging to the silicon is effected through an oxygen atom, three moles of 3-hydroxydiphenylamine may be reacted with one mole of γ-aminopropyltriethoxysilane while heating to a temperature of the order of 100° C. for several minutes to yield the desired silane.

One hundred grams of hydrocarbon polymer pellets were initially worked up to a melt on a 6″ x 12″ two-roll mill and various concentrations of antioxidant, ranging up to 1.0 percent, by weight, based on the weight of the polymer were incorporated into the polymer being tested. Milling was then effected for a time period of approximately five minutes at temperatures of about 130° C. The polymer used in such studies was a high molecular weight polyethylene high pressure polymer obtained from commercial sources. The samples were obtained by molding the mill massed compositions against 5 mil polished sheet aluminum at 150° C. under pressure and cooled rapidly thereafter. Following molding, the samples were stored in water and maintained at room temperature for 64 hours. After storage, the resultant films were cut and placed in a holder suitable for spectral analysis. In order to remove exuded antioxidant from the surfaces of the film prior to insertion in the holder, cleansing was effected in water and containing a commercially available detergent followed by a water rinse. Oven aging was then effected at 60° C. and 70° C. for various time periods and spectral analysis was made to determine the amount of retained antioxidant.

With reference now to FIG. 1, there is shown a graphical representation on coordinates of time in hours against antioxidant concentration as derived from ultraviolet spectra for 60° and 70° C. aging temperatures for polyethylene containing 0.8 percent by weight of aminopropyltri(diphenylamino) oxysilane. As a control, the procedure was repeated using polyethylene containing 0.1 percent by weight of 3-hydroxydiphenylamine. Analysis of the Figure reveals that the control, the 3-hydroxydiphenylamine exuded far more rapidly from the polyethylene than the silane.

Figure 2:
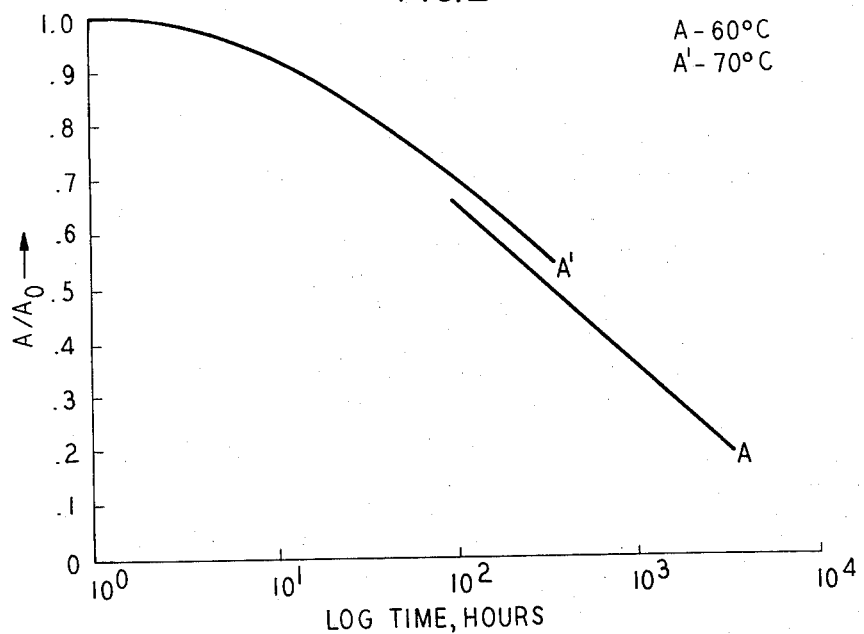
FIG. 2 is a graphical representation on coordinates of time versus antioxidant concentration for polyethylene samples containing γ - N-phenylaminopropyltrimethoxysilane.

FIG. 2 is another graphical representation on coordinates of time in hours against antioxidant concentration as derived from ultraviolet spectra at 60 and 70° C. aging temperatures of polyethylene containing 0.27 percent, by weight, (3-phenylaminopropyl) trimethoxysilane containing 0.035 percent of an accelerator, γ-aminopropyltriethoxysilane. Phenylpropylamine is not retained at all under the described conditions; accordingly, no control was available.

What is claimed is:

1. Composition stabilized against oxidative degradation comprising a normally solid polymer of an alpha olefin having incorporated therein the product formed by reacting a molar excess of an alkoxy silane with an arylamine at a temperature of the order of 100° C.
said alkoxy silane being of the general formula $$[RO]_x\text{---}Si\text{---}[(CH_2)_n\text{---}R']_{4-x}$$

wherein R is selected from the group consisting of methyl and ethyl radicals, R' is selected from the group consisting of NH$_2$, Cl, Br, OH, 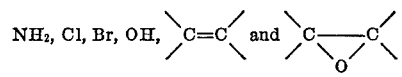

radicals, $x$ is an integer from 1–4 and $n$ is an integer from 1–10,
said arylamine antioxidant being of the general formula

AY wherein A is an arylamine antioxidant radical and Y is selected from the group consisting of NH$_2$, OH, Cl, Br, and COOH radicals, said product being present in an amount ranging from 0.005 to 2 percent, by weight, based upon the weight of the polymer.

2. Composition in accordance with claim 1 wherein Y is an OH radical.

3. Composition in accordance with claim 2 wherein said alkoxysilane is γ-aminopropyltriethoxysilane and said arylamine is 3-hydroxydiphenylamine.

4. Composition in accordance with claim 2 wherein said polymer is polyethylene.

References Cited
UNITED STATES PATENTS

| | | | |
|---|---|---|---|
| 3,431,129 | 3/1969 | Ismail | 260—45.9 R |
| 3,647,749 | 3/1972 | Zaweski et al. | 260—45.9 R |

MELVYN I. MARQUIS, Primary Examiner

U.S. Cl. X.R.

117—132 R; 260—45.8 A